(12) United States Patent
Mayhew et al.

(10) Patent No.: US 12,209,651 B1
(45) Date of Patent: Jan. 28, 2025

(54) TRANSMISSION FLUID CHANGE USING INTERNAL PUMP

(71) Applicant: FCA US LLC, Auburn Hills, MI (US)

(72) Inventors: William R Mayhew, Ann Arbor, MI (US); Steven Christ, Ann Arbor, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/494,348

(22) Filed: Oct. 25, 2023

(51) Int. Cl.
*F16H 57/04* (2010.01)
*F16N 31/00* (2006.01)

(52) U.S. Cl.
CPC ......... *F16H 57/0408* (2013.01); *F16N 31/00* (2013.01); *F16N 2210/12* (2013.01)

(58) Field of Classification Search
CPC ... F16N 31/00; F16N 2210/12; B63H 20/002; F16H 57/0435
USPC .......................................................... 184/1.5
See application file for complete search history.

(56) References Cited

U.S. PATENT DOCUMENTS

| | | | |
|---|---|---|---|
| 6,330,934 B1 * | 12/2001 | Viken | F01M 11/04 141/94 |
| 9,896,172 B1 * | 2/2018 | Pugh | F16H 57/0435 |
| 2013/0048088 A1 * | 2/2013 | Miller | B01D 35/02 137/1 |
| 2016/0236657 A1 * | 8/2016 | Erwin | B67D 7/78 |
| 2024/0026964 A1 * | 1/2024 | Itou | F16H 57/0441 |

* cited by examiner

*Primary Examiner* — Michael R Mansen
*Assistant Examiner* — Mark K Buse
(74) *Attorney, Agent, or Firm* — Jeremy J. Klobucar

(57) ABSTRACT

A method of draining transmission fluid through a drain hole of a transmission having an electrically driven auxiliary oil pump therein is provided. The method includes enabling, at a service computer, an oil drain service. The auxiliary oil pump is commanded on such that transmission fluid is pumped throughout the transmission and out of the drain hole. A determination is made whether the transmission fluid has sufficiently been drained out of the drain hole. The auxiliary oil pump is commanded off based on a determination that sufficient transmission fluid has been sufficiently drained out of the drain hole.

13 Claims, 2 Drawing Sheets

TRANSMISSION FLUID CHANGE USING INTERNAL PUMP

FIELD

The present application generally relates to a method for draining transmission fluid out of a transmission using an electrically powered auxiliary transmission fluid pump.

BACKGROUND

Transmissions are provided in motor vehicles in many configurations for providing speed-changing gears between an engine and a drive axle. Vehicle transmissions typically include a plurality of clutches for transmitting rotational energy from the engine to the wheels of the vehicle. The plurality of clutches are selectively engaged and disengaged to shift the transmission into a desired gear ratio. Transmission fluid is housed within the transmission and is responsible for lubricating mechanical parts and maintaining fluid pressure within the transmission. Over time transmission fluid can break down and become contaminated with particles and debris which can lead to decrease in performance when shifting or engaging gears. In such situations it may be desirable to change the transmission fluid. Typical methods of replacing the transmission fluid include first draining the transmission fluid through a drain hole in the transmission case using gravity to slowly urge the transmission fluid out of the transmission. Once drained, fresh transmission fluid is replaced into the transmission. Such methods of draining transmission fluid however are time consuming and do not result in all of the transmission fluid from being drained from the transmission. In this regard, while such methods for draining transmission fluid do work well for their intended purpose, there exists an opportunity for improvement in the relevant art.

SUMMARY

According to one example aspect of the invention, a method of draining transmission fluid through a drain hole of a transmission having an electrically driven auxiliary oil pump therein is provided. The method includes enabling, at a service computer, an oil drain service. The auxiliary oil pump is commanded on such that transmission fluid is pumped throughout the transmission and out of the drain hole. A determination is made whether the transmission fluid has sufficiently been drained out of the drain hole. The auxiliary oil pump is commanded off based on a determination that sufficient transmission fluid has been sufficiently drained out of the drain hole.

In some implementations, the method includes removing a drain plug from the transmission to open the drain hole.

In some implementations, commanding the auxiliary oil pump on comprises commanding a transmission controller to command the auxiliary oil pump on.

According to another example aspect of the invention, determining whether the transmission fluid has been sufficiently drained out of the drain hole comprises determining, at a hydraulic control solenoid fluidly connected to the drain hole, that a load flow has reached a flow threshold corresponding to a sufficient fluid draining. The hydraulic control solenoid includes a regulating valve that moves between a first position corresponding to a load flow insufficient to satisfy fluid draining and a second position corresponding to a load flow sufficient to satisfy fluid draining.

In some implementations, determining whether the transmission fluid has sufficiently been drained out of the drain hole further comprises determining whether a time threshold has been reached since the auxiliary oil pump was commanded on.

In some implementations, determining whether the transmission fluid has sufficiently been drained out of the drain hole further comprises determining whether a sufficient volume of transmission fluid has been drained from the transmission.

In some implementations, determining whether the transmission fluid has sufficiently been drained out of the drain hole further comprises determining that an insignificant amount of transmission fluid is observed draining out of the drain hole.

In some implementations, determining whether the transmission fluid has sufficiently been drained out of the drain hole further comprises measuring a load at the electrically driven auxiliary oil pump; and determining a sufficient volume of transmission fluid has been drained from the transmission based on the measured load.

According to another example aspect of the invention, a method of draining transmission fluid through a drain hole of a transmission having an electrically driven auxiliary oil pump therein is provided. The method includes enabling, at a service computer, an oil flush service. The auxiliary oil pump is commanded on such that transmission fluid is power flushed throughout the transmission and out of the drain hole. A determination is made whether the transmission fluid has sufficiently been drained out of the drain hole. The auxiliary oil pump is commanded off based on a determination that sufficient transmission fluid has been sufficiently drained out of the drain hole.

In some implementations, the method includes removing a drain plug from the transmission to open the drain hole.

In some implementations, commanding the auxiliary oil pump on comprises commanding a transmission controller to command the auxiliary oil pump on.

According to another example aspect of the invention, determining whether the transmission fluid has been sufficiently drained out of the drain hole comprises determining, at a hydraulic control solenoid fluidly connected to the drain hole, that a load flow has reached a flow threshold corresponding to a sufficient fluid draining. The hydraulic control solenoid includes a regulating valve that moves between a first position corresponding to a load flow insufficient to satisfy fluid draining and a second position corresponding to a load flow sufficient to satisfy fluid draining.

In some implementations, determining whether the transmission fluid has sufficiently been drained out of the drain hole further comprises determining whether a time threshold has been reached since the auxiliary oil pump was commanded on.

In some implementations, determining whether the transmission fluid has sufficiently been drained out of the drain hole further comprises determining whether a sufficient volume of transmission fluid has been drained from the transmission.

In some implementations, determining whether the transmission fluid has sufficiently been drained out of the drain hole further comprises determining that an insignificant amount of transmission fluid is observed draining out of the drain hole.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As discussed above, over time transmission fluid within a transmission can break down and become contaminated with particles and debris which can lead to decrease in performance when shifting or engaging gears. In such situations it may be desirable to change the transmission fluid. As used herein the terms "transmission fluid" and "oil" are used interchangeably. Typical methods of replacing transmission fluid include draining the transmission fluid through a drain hole in the transmission case using gravity to slowly urge the transmission fluid out of the transmission. Such methods however are time consuming and do not result in all of the transmission fluid from being drained from the transmission.

The present disclosure provides a method for pumping the transmission fluid out of the drain hole of the transmission by using the transmission's electrically powered auxiliary oil pump to power flush the transmission fluid out of the transmission.

Figure 1:
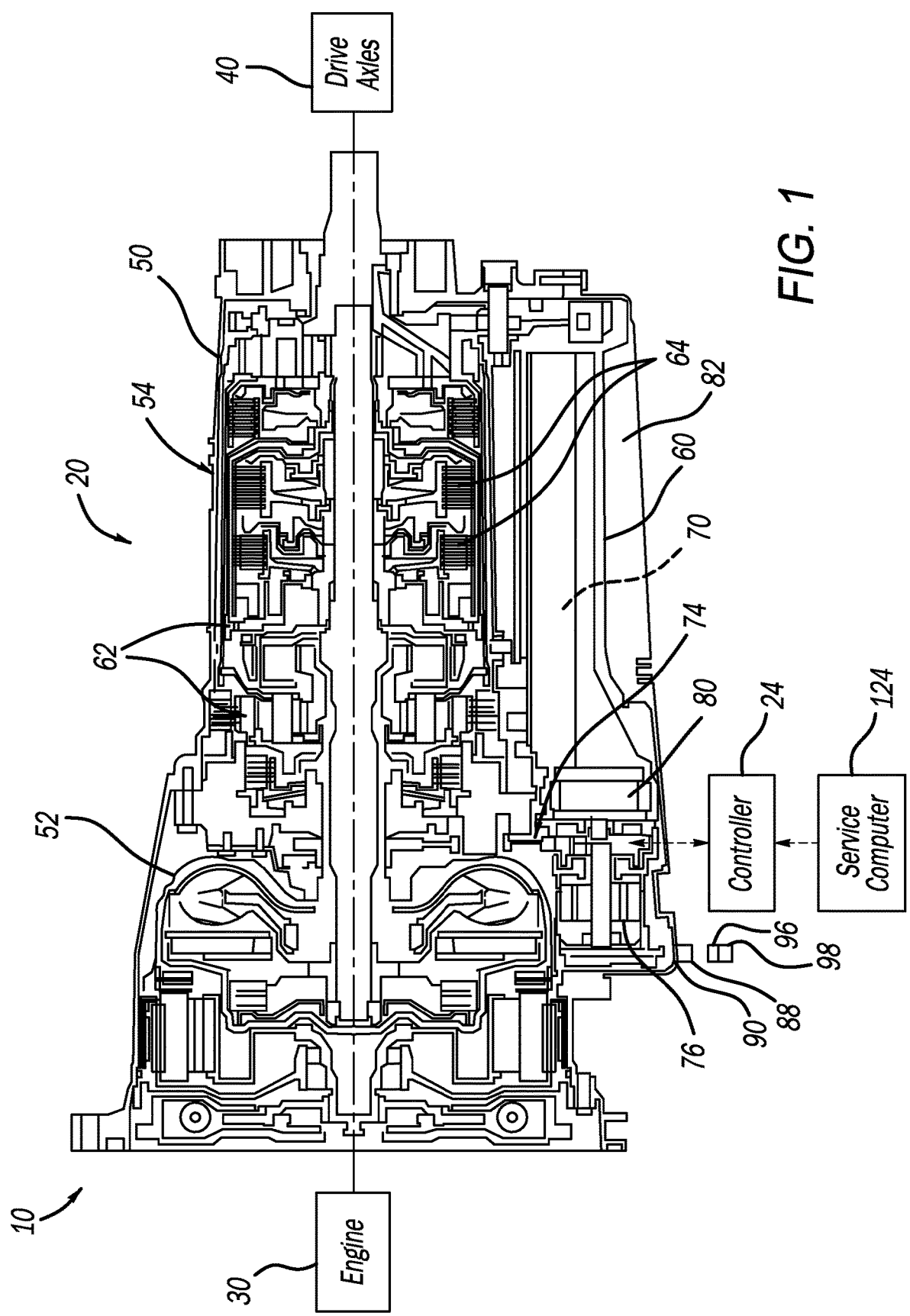
FIG. 1 is a partial schematic illustration of an automatic transmission receiving an input from an engine and providing an output to drive axle(s) according to the principles of the present application.

With initial reference to FIG. 1, an exemplary powertrain 10 includes a transmission system 20 that receives a rotational input from an engine 30 and converts the rotational input into a rotational output to drive axle(s) 40. The transmission system 20 includes a transmission 50 having a torque convertor 52, a gearbox 54 and an electro-hydraulic control system 60. In examples, a crankshaft of the engine 30 is coupled to the torque convertor 52. Inside the torque convertor 52, rotatable power from the engine 30 is transferred to the gearbox 54 hydrodynamically. The gearbox 54 locks and unlocks various sets of gears 62 to achieve various gear ratios.

The gears 62 of the gearbox 54 can include various planetary gear sets. Various clutches 64 can facilitate shifting between the gears 62. A transmission control module or controller 24 determines shift change timing based on driving conditions and other inputs from the engine 30. In this regard, the controller 24 sends signals to the electrohydraulic control system 60 indicative of a shift change request whereby oil or transmission fluid 70 can be redirected throughout the transmission system 20 to engage and disengage the clutches 64 and cause a change in gears 62 and therefore a change in gear ratio. It will be appreciated that the transmission 50 shown and described is merely exemplary and the present teachings may be adapted to any transmission having an auxiliary oil pump. Further, the present teachings can be also adapted to any mechanical system, beyond transmissions, that includes an electrical pump therein configured to circulate oil.

Transmission fluid 70 is housed within the transmission 50 and is responsible for lubricating the mechanical parts within the transmission 50 and maintaining fluid pressure within the transmission 50. The exemplary transmission 50 is an automatic transmission that includes a mechanical oil pump 74 that can be driven off of the engine 30 and also be driven by an electrically powered auxiliary oil pump 80. The auxiliary oil pump 80 is driven by an electric drive motor 76. Transmission fluid 70 can generally collect in a transmission sump 82 where the transmission fluid 70 can be recirculated throughout the transmission 50. The transmission 50 includes a transmission drain plug 88 threadably removably coupled to the drain hole 90 provided in the transmission 50. The transmission drain plug 88 can be manually removed from the drain hole 90 during a transmission fluid draining event as will be described herein.

Figure 2:
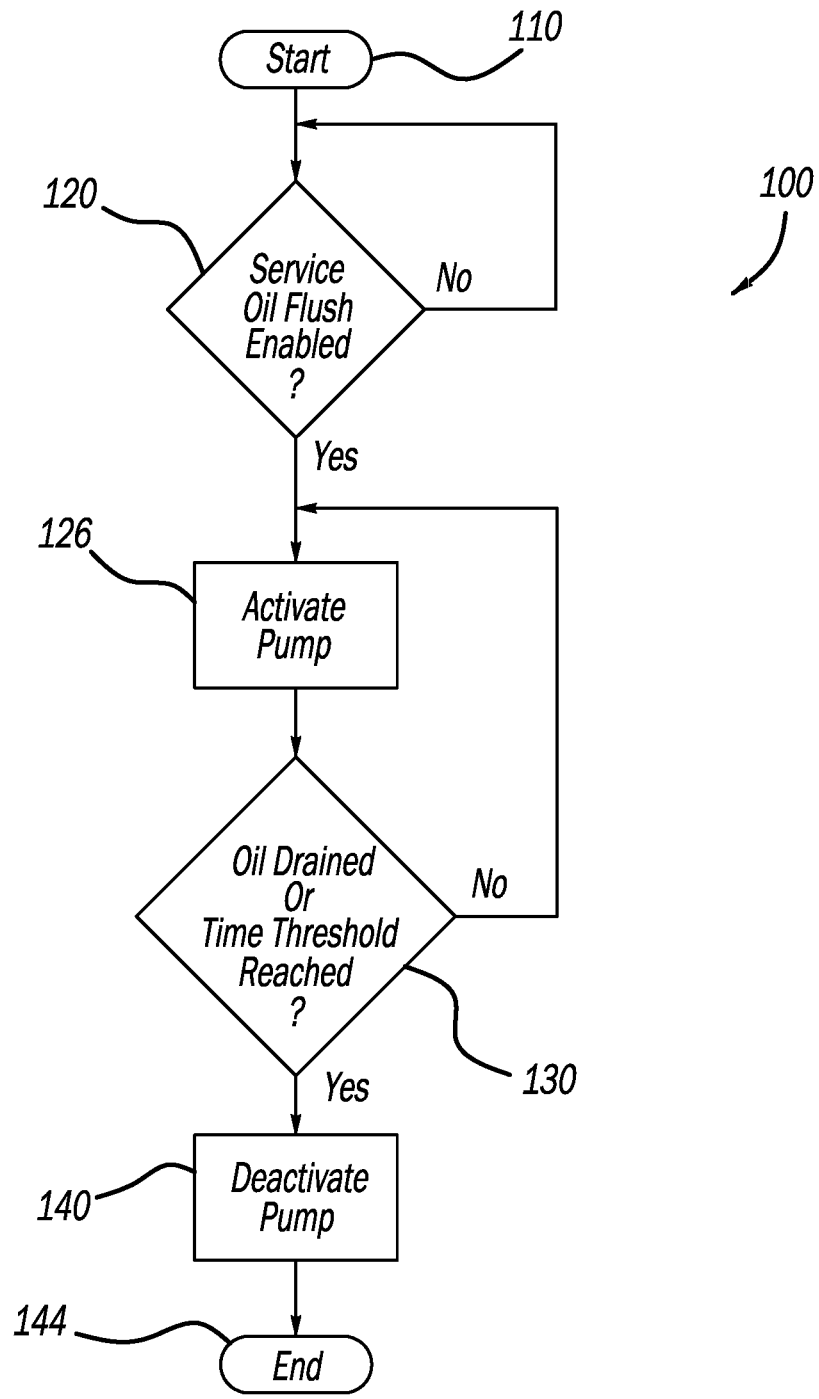
FIG. 2 is an exemplary flow diagram showing a method for changing automatic transmission fluid in the automatic transmission of FIG. 1 according to examples of the present disclosure.

With continued reference to FIG. 1 and additional reference now to FIG. 2, a method 100 of draining the transmission fluid 70 from the transmission 50 according to the present disclosure will be described. At 110 control begins. At 120 control determines whether a service oil flush has been enabled. A service oil flush can be enabled such as at a service station by a service technician. It will be understood that the service technician will open or remove the transmission oil drain plug 88 from the drain hole 90 in connection with enabling the service oil flush 120. In examples, a service oil flush can be initiated with a service computer 124 that is coupled for communication with the controller 24. If control determines that a service oil flush has not been enabled at 120, control loops to 120.

If control determines that a service oil drain or flush has been enabled at 120 control activates or commands on the hydraulic pump 80 at 126. Activating the hydraulic pump 80 will cause the transmission fluid 70 to be pumped within the transmission system 20 and ultimately power flushed out of the drain hole 90 of the transmission 50. By activating the hydraulic pump 80, any debris would be urged out of the transmission 50 resulting in a more thorough draining of the transmission fluid 70. Using only the electric motor 76 to drive the hydraulic pump 80 is a safer alternative than running the engine 30 for hydraulic power. In this regard, the method 100 allows for engine off transmission fluid changes that is more thorough since hydraulic power can flush the transmission system 20 more effectively than relying on gravity alone.

At 130 control determines whether the transmission fluid 70 has been sufficiently drained. In examples, control can determine that the transmission fluid 70 has been sufficiently drained based on a hydraulic solenoid 96 attached to a flow load of the transmission fluid 70. The solenoid 96 can include an internal regulating valve 98 that can take two different positions depending upon the load flow of the transmission fluid 70. In other examples, control can determine that the transmission fluid 70 has been sufficiently drained based on a time threshold being reached. In other words, the transmission fluid 70 has been sufficiently drained if the drive motor 76 has driven the hydraulic pump 80 for a predetermined amount of time. In other examples, the amount of transmission fluid 70 drained can be measured and a determination that the transmission fluid 70 has been sufficiently drained based on a volume of transmission fluid 70 drained reaches a threshold. In still other examples, control can determine that the transmission fluid 70 has been sufficiently drained based on observing, such as at the controller 24 and/or the service computer 124 how hard the hydraulic pump 80 is working. As less pumping work is needed to move air than to move transmission fluid 70, once the transmission fluid 70 has been pumped out, the electric power demand at the drive motor 76 is less. Such load change can be measured and based on an observed load change, a determination can be made to conclude the pumping process at the hydraulic pump 80.

In still other examples, the service technician can determine that a sufficient volume of transmission fluid 70 has been drained from the transmission 50 based on observing an insignificant amount of transmission fluid 70 being drained through the hole 90. In some examples, more than one of the above scenarios may need to be satisfied to determine that transmission fluid 70 has sufficiently been drained from the transmission 50 at 130. If control determines that sufficient transmission fluid 70 has not been drained from the transmission 50 at 130 control loops to 126. If control determines that sufficient transmission fluid 70 has been drained from the transmission 50 at 130, control deactivates the drive motor 76 and therefore the hydraulic pump 80 at 140. Control ends at 144.

The method 100 described herein allows a non-intrusive system characterization on any hydraulic piston control system beyond the transmission system 20 described herein for removing oil or fluid therefrom. In this regard, the fluid draining techniques can be done without applying torque, allowing safety critical functional tests, diagnostics and self-learning algorithms without being noticeable to a human driver.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A method of draining transmission fluid through a drain hole of a transmission, the transmission having an electrically driven auxiliary oil pump therein, the method comprising:
   enabling, at a service computer, an oil drain service;
   removing a drain plug from the transmission to open the drain hole;
   commanding a transmission controller to command the auxiliary oil pump on, the auxiliary oil pump thereby pumping the transmission fluid within the transmission and draining the transmission fluid out of the drain hole in the transmission;
   determining whether the transmission fluid has sufficiently been drained out of the drain hole; and
   commanding, based on a determination that sufficient transmission fluid has been sufficiently drained out of the drain hole, the auxiliary oil pump off.

2. The method of claim 1, wherein determining whether the transmission fluid has sufficiently been drained out of the drain hole comprises:
   determining, at a hydraulic control solenoid fluidly connected to the drain hole, that a load flow has reached a flow threshold corresponding to a sufficient fluid draining.

3. The method of claim 2, wherein the hydraulic control solenoid includes a regulating valve wherein the regulating valve moves between a first position corresponding to a load flow insufficient to satisfy fluid draining and a second position corresponding to a load flow sufficient to satisfy fluid draining.

4. The method of claim 2, wherein determining whether the transmission fluid has sufficiently been drained out of the drain hole further comprises:
   determining whether a time threshold has been reached since the auxiliary oil pump was commanded on.

5. The method of claim 2, wherein determining whether the transmission fluid has sufficiently been drained out of the drain hole further comprises:
   determining whether a sufficient volume of transmission fluid has been drained from the transmission.

6. The method of claim 2, wherein determining whether the transmission fluid has sufficiently been drained out of the drain hole further comprises:
   determining that an insignificant amount of transmission fluid is observed draining out of the drain hole.

7. The method of claim 2, wherein determining whether the transmission fluid has sufficiently been drained out of the drain hole further comprises:
   measuring a load at the electrically driven auxiliary oil pump; and
   determining a sufficient volume of transmission fluid has been drained from the transmission based on the measured load.

8. A method of draining transmission fluid through a drain hole of a transmission, the transmission having an electrically driven auxiliary oil pump therein, the method comprising:
   enabling, at a service computer, an oil flush service;
   removing a drain plug from the transmission to open the drain hole;
   commanding a transmission controller to command the auxiliary oil pump on, the auxiliary oil pump thereby power flushing the transmission fluid within the transmission and draining the transmission fluid out of the drain hole in the transmission;
   determining whether the transmission fluid has sufficiently been drained out of the drain hole; and
   commanding, based on a determination that sufficient transmission fluid has been sufficiently drained out of the drain hole, the auxiliary oil pump off.

9. The method of claim 8, wherein determining whether the transmission fluid has sufficiently been drained out of the drain hole comprises:

determining, at a hydraulic control solenoid fluidly connected to the drain hole, that a load flow has reached a flow threshold corresponding to a sufficient fluid draining.

10. The method of claim 9, wherein the hydraulic control solenoid includes a regulating valve wherein the regulating valve moves between a first position corresponding to a load flow insufficient to satisfy fluid draining and a second position corresponding to a load flow sufficient to satisfy fluid draining.

11. The method of claim 9, wherein determining whether the transmission fluid has sufficiently been drained out of the drain hole further comprises:

determining whether a time threshold has been reached since the auxiliary oil pump was commanded on.

12. The method of claim 9, wherein determining whether the transmission fluid has sufficiently been drained out of the drain hole further comprises:

determining whether a sufficient volume of transmission fluid has been drained from the transmission.

13. The method of claim 9, wherein determining whether the transmission fluid has sufficiently been drained out of the drain hole further comprises:

determining that an insignificant amount of transmission fluid is observed draining out of the drain hole.

* * * * *